US012344289B2

(12) United States Patent
Goncalves et al.

(10) Patent No.: US 12,344,289 B2
(45) Date of Patent: Jul. 1, 2025

(54) BRAKING SYSTEM COMPRISING BRAKE RIGGING, AND VEHICLE EQUIPPED WITH SUCH A BRAKING SYSTEM

(71) Applicant: Wabtec Hauts-de-France, Amiens (FR)

(72) Inventors: Claudino Goncalves, Ribeaucourt (FR); Denis Gerber-Papin, L'Etoile (FR); Damien Beauvois, Amiens (FR)

(73) Assignee: Wabtec Hauts-de-France, Amiens (FR)

( * ) Notice: Subject to any disclaimer, the term of this patent is extended or adjusted under 35 U.S.C. 154(b) by 366 days.

(21) Appl. No.: 17/628,182

(22) PCT Filed: Jul. 23, 2020

(86) PCT No.: PCT/EP2020/070887
§ 371 (c)(1),
(2) Date: Jan. 18, 2022

(87) PCT Pub. No.: WO2021/018743
PCT Pub. Date: Feb. 4, 2021

(65) Prior Publication Data
US 2022/0258776 A1    Aug. 18, 2022

(30) Foreign Application Priority Data

Jul. 26, 2019 (FR) ...................................... 1908510
Jul. 26, 2019 (FR) ...................................... 1908512
Oct. 18, 2019 (FR) ...................................... 1911666

(51) Int. Cl.
*B61H 5/00* (2006.01)
*B61H 13/34* (2006.01)
(Continued)

(52) U.S. Cl.
CPC ............... *B61H 5/00* (2013.01); *B61H 13/34* (2013.01); *B61H 13/36* (2013.01);
(Continued)

(58) Field of Classification Search
CPC .......................... F16D 65/0973; B61H 13/34
See application file for complete search history.

(56) References Cited

FOREIGN PATENT DOCUMENTS

DE           2233180 A1    1/1974
DE    102017101028 A1    7/2018
(Continued)

OTHER PUBLICATIONS

International Search Report for corresponding International application No. PCT/EP2020/070887 (4 pages).
(Continued)

*Primary Examiner* — Melody M Burch
(74) *Attorney, Agent, or Firm* — K&L Gates LLP

(57) ABSTRACT

The invention relates to a railway braking system for a rail vehicle. The system includes a brake rigging, a service and/or parking brake designed to act on at least one braking member of the vehicle via the brake rigging (which is provided with at least one device having at least one lining support and at least one lining that is mechanically attached to the at least one lining support), and at least one force transmission link. The force transmission link has a first end mechanically attached to a support of the vehicle and an opposite second end mechanically attached to the at least one lining support. The at least one lining support comprises a fastening leg that includes a housing and a mounting member accommodated in the housing, and the second end of the at least one force transmission link is rotatably mounted in the mounting member.

20 Claims, 16 Drawing Sheets

(51) Int. Cl.
*B61H 13/36* (2006.01)
*F16D 55/224* (2006.01)
*F16D 65/095* (2006.01)
*F16D 65/097* (2006.01)
*F16D 65/18* (2006.01)
*F16D 69/04* (2006.01)
*F16D 127/06* (2012.01)

(52) U.S. Cl.
CPC ....... *F16D 55/2245* (2013.01); *F16D 65/095* (2013.01); *F16D 65/0973* (2013.01); *F16D 65/183* (2013.01); *F16D 69/0408* (2013.01); *F16D 65/18* (2013.01); *F16D 2127/06* (2013.01)

(56) References Cited

FOREIGN PATENT DOCUMENTS

| | | | |
|---|---|---|---|
| EP | 2154040 B1 | | 11/2012 |
| EP | 2826684 B1 | | 4/2016 |
| FR | 2631600 A1 | * | 11/1989 |
| FR | 2706844 A1 | | 12/1994 |
| FR | 2729357 A1 | * | 7/1996 ............. B61H 11/14 |

OTHER PUBLICATIONS

Written Opinion for corresponding International application No. PCT/EP2020/070887 (7 pages).

* cited by examiner

BRAKING SYSTEM COMPRISING BRAKE RIGGING, AND VEHICLE EQUIPPED WITH SUCH A BRAKING SYSTEM

CROSS-REFERENCE TO RELATED APPLICATIONS

This application is a national stage entry of International Patent Application No. PCT/EP2020/070887 (filed 23 Jul. 2020), which claims priority to French Patent Application No. 1908510 (filed 26 Jul. 2019), French Patent Application No. 1908512 (filed 26 Jul. 2019), and French Patent Application No. 1911666 (filed 18 Oct. 2019), the entire disclosures of which are incorporated herein by reference.

BACKGROUND

Technical Field

The invention concerns the field of rail vehicle brakes. More particularly, the invention concerns a braking system for a rail vehicle having brakes with at least one lining, provided with a braking linkage and with a service brake and/or parking brake configured to act on the braking members of the vehicle, for example such as brake disks, via the braking linkage.

Discussion of Art

The rail vehicles having brakes with at least one lining are generally equipped with braking systems having service brake and/or parking brake cylinders. The brakes include a piston movable under the effect of a fluid under pressure. The movement of that piston actuates a braking linkage and drives a braking action such as the clamping of a brake disk by the lining of that linkage.

Such a braking system is mounted on the rail vehicle, to be in contact with the brake disks or the wheels. In particular, the braking system may be mechanically connected to a bogie, to an axle fastened to the bogie, or to another device like the drive motor or the gearbox also mounted on the bogie.

The braking action gives rise to braking forces which may be transmitted, via the braking linkage, to the mounting to which the braking system is mechanically connected. These forces may generate deformations, or at least movements, of the braking linkage relative to the brake disk of the vehicle, thereby giving rise to irregular wear of the lining.

BRIEF DESCRIPTION

The invention concerns a braking system for a vehicle having brakes with at least one lining, having improved strength properties and which remains simple, convenient and economical.

According to a first aspect, the invention thus relates to a rail vehicle braking system, comprising a braking linkage, a service brake, and/or parking brake that may act on at least one braking member of the rail vehicle via the braking linkage. The linkage may be provided with at least one device having at least one lining mounting and at least one lining mechanically connected to the at least one lining mounting. At least one force transmission link member may be mechanically connected by a first end to a mounting of the vehicle and at a second end, which is an opposite end to the first end, to the at least one lining mounting. The at least one lining mounting comprises an attachment lug provided with an housing and with a mounting member housed in the housing. The at least one force transmission link member may be rotatably mounted by its second end in the mounting member.

By virtue of the mounting member which is mounted in the housing of the fastener lug without substantial play, the link member may have neither horizontal nor vertical play relative to the lining mounting.

This may make it possible to limit the movements of tilting type of the rail vehicle braking system relative to the braking member of the vehicle and thereby avoid misalignment of the lining mounting and thus of the linings relative to that braking member.

On the contrary, the possibility of rotational movement between the force transmission link member and the lining mounting may enable the lining mounting to self-tilt to maintain optimum application of the braking force, while making it possible to send the forces to the vehicle mounting. This, in addition, may make it possible to limit the wear of the linings obliquely, despite the deformations which for example the brake member may undergo.

Features according to the invention that are preferred, simple, convenient, and economical are presented below.

The at least one force transmission link member may be substantially L-shaped, S-shaped, H-shaped, or Y-shaped.

The at least one force transmission link member may be mechanically connected by pivotal connections respectively to the vehicle mounting and to the at least one lining mounting.

The at least one force transmission link member may be provided, at its second end, with a shaft integrally formed with the force transmission link member and projecting from a main arm of the transmission link member.

The at least one force transmission link member may be provided, at its second end, with a sleeve inserted into a main arm of the transmission link member and with a fastening member mounted through the sleeve and mechanically connected in the main arm.

The at least one lining mounting may comprise a retaining part fixedly mounted in The housing and superposed with the mounting member.

The at least one lining mounting can furthermore comprise at least one elastic member interposed between the retaining part and the mounting member.

The at least one elastic member may be formed by one or more Belleville washers, by at least one spring (which may, for example, be helical), or at least one elastomer.

The linkage may comprise at least one lever extending from the service brake and/or parking brake to the device to which it is fastened at an attachment region of the at least one lining mounting. The at least one lever may transmit a force of application of the service brake and/or parking brake to the device. The at least one force transmission link member may be fastened in immediate proximity to the attachment region of the at least one lever.

The at least one lining mounting may be provided with a lower support and with a mounting shaft rotatably mounted between the fastener lug and the lower support. The lever may be mechanically connected to the mounting shaft.

The mounting shaft may be interposed between the mounting member and a stop member at the location of the lower support.

The attachment region may be located at most 35 millimeters (mm) from a transverse central axis of the device.

In other words, the loads applied by the lever of the braking linkage on the device for that linkage to place it in contact with the braking member of the vehicle, for example in particular a brake disk, may be substantially centered on the lining mounting. Since the attachment region of the lever on the lining mounting may be close to the transverse central axis of the device, this may enable the lining mounting to have a degree of freedom when lining mounting transmits forces to the brake disk of the vehicle.

In particular, the lining mounting can more easily self-tilt to adapt to the type of braking system and/or to the conditions of use of the rail vehicle. For example, the arrangement of the braking linkage, the arrangement and/or the materials of the lining mounting and/or of the linings, the fact of whether it is a parking brake or else a service brake, the type of vehicle (tram, subway train, high-speed train, etc.), the load of the vehicle, the journey made by the vehicle, and/or the type of braking member (diameter, thickness, material of the disk) may be parameters that enable the lining mounting to optimally locate.

The attachment region may be located between approximately 0 and 35 mm from the transverse central axis of the device.

The attachment region may extend in a longitudinal general orientation of the device and over a length comprised between approximately 15 mm and approximately 70 mm.

The attachment region may extend uninterruptedly on opposite sides of the transverse central axis of the device.

The at least one attachment region may extend interruptedly on opposite sides of the transverse central axis of the device.

The at least one force transmission link member may extend substantially in a same plane as that in which extends the at least one lever.

The device may comprise at least two bearing regions for bearing on the at least one braking member and at least one set back region located between the two the bearing regions.

The at least one lining mounting and/or the at least one lining may have a longitudinal general orientation and a transverse general orientation, with the bearing and set back regions succeeding each other in the longitudinal general orientation.

The system may comprise at least two linings mechanically connected to the lining mounting. At least one bearing region may be located facing opposite the respective lining.

The at least two bearing regions and the at least one set back region may be provided on the at least one lining mounting.

The at least two bearing regions and the at least one set back region may be provided on the at least one lining.

The device may comprise plural bearing regions between which are formed the set back regions.

Such bearing and set back regions are configured to distribute the transmission of the forces over the braking member. These regions may be quite different from any regions for fastening the linings onto the lining mounting, these latter not being configured to distribute the transmission of the forces over the braking member.

The at least one lining mounting and/or the at least one lining may have a longitudinal general orientation and a transverse general orientation, with the bearing and set back regions succeeding each other in the longitudinal general orientation.

At least one the bearing and/or set back region may extend fully or only partly along the transverse general orientation.

The bearing and set back regions may be provided substantially symmetrically relative to a transverse central axis of the device. This axis may, for example, constitute a median axis of the braking member of the rail vehicle.

At least one the bearing region may be of stepped form and thereby comprise different bearing portions offset to a greater or lesser extent relative to the adjacent set back region.

According to a second aspect, the invention also may relate to a rail vehicle comprising at least one braking member, for example in particular a brake disk, and at least one rail vehicle braking system as described above, which is configured to act on the at least one braking member

BRIEF DESCRIPTION OF THE DRAWINGS

The disclosure of the invention will now be continued with the description of embodiments, given below by way of illustrative and non-limiting examples, with reference to the accompanying drawings.

DETAILED DESCRIPTION

Figure 1:
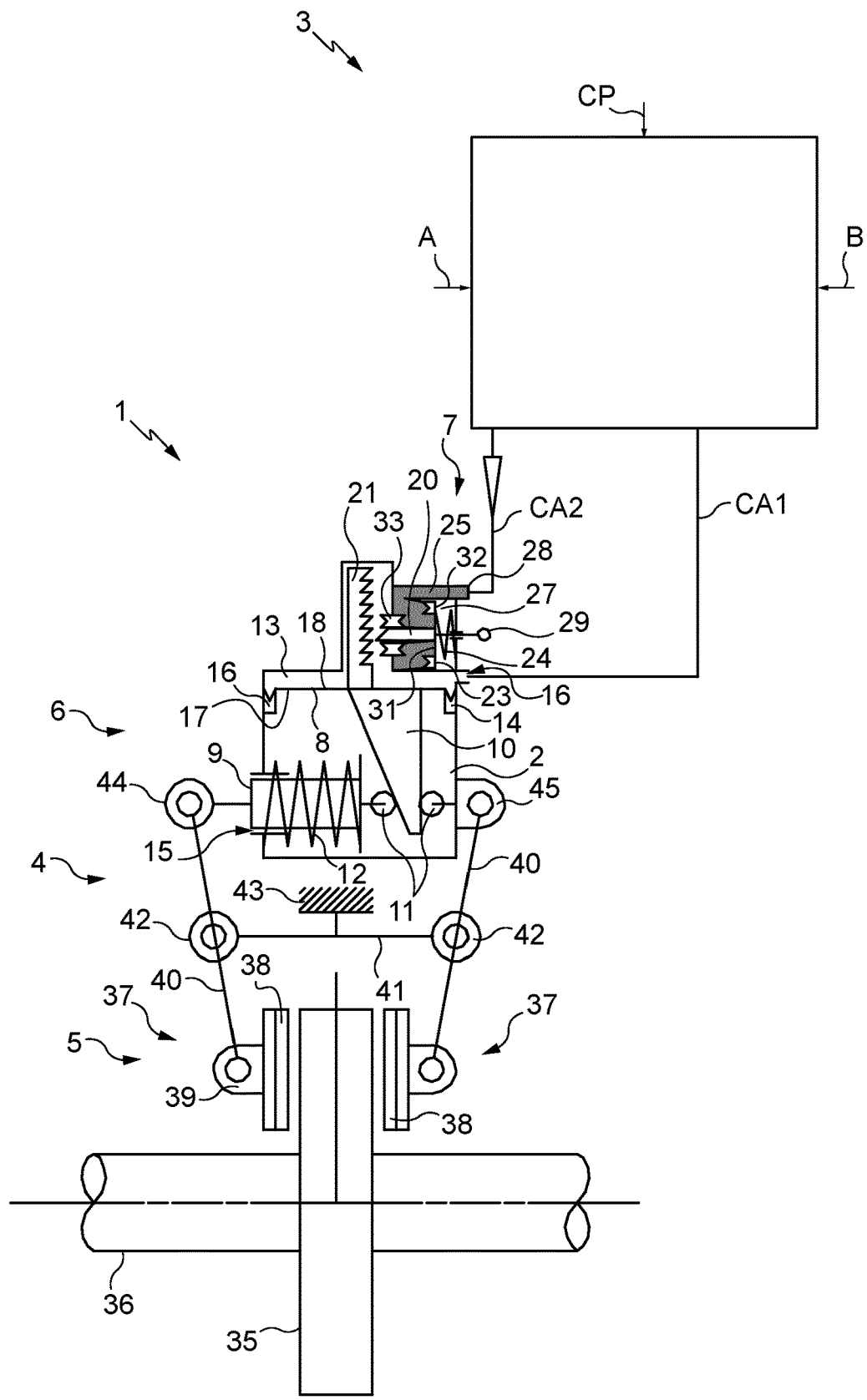
FIG. 1 is a diagrammatic and partial illustration of a rail vehicle braking system provided in particular with a service brake, a parking brake, and with a control and actuation unit.

FIG. 1 diagrammatically represents a rail vehicle braking system 1 for a rail vehicle having a brake with linings. This is a rail vehicle braking system structurally of the type described in European patent application EP 2 826 684. The rail vehicle braking system 1 comprises a body 2 here forming a cylinder of both a service brake 6 and a parking brake 7, a control and actuation unit 3 configured to manage the operation of the service brake 6 and of the parking brake 7, a conveyance network of pneumatic pipes that is connected to the body 2 and to the control and actuation unit 3, and a braking linkage 4 mechanically linked to the body 2. The body 2 here has the form of a generally closed envelope.

The service brake 6 comprises a service brake piston 8 movable relative to the body 2 in a first axial direction, and a thrust rod 9 also movable relative to the body 2 in a second axial direction perpendicular to the first axial direction. Together with the body 2, the braking piston 8 delimits a service brake pressure chamber 13. The braking piston 8 has two sides respectively a first side 17 configured to act on the braking linkage 4 via the thrust rod 9 and a second side 18 which is an opposite side to the first side 17 and which is turned towards the service brake pressure chamber 13.

The service brake 6 further comprises a notched rod 21 fastened to the second side 18 of the braking piston 8. This notched rod 21 extends longitudinally in the first axial direction. The braking piston 8 is configured to move in the body 2 while maintaining the service brake pressure chamber 13 relatively fluid-tight thanks to a membrane 14, for example formed by a seal, disposed between that braking piston 8 and inside edges of the body 2.

The service brake 6 may further comprise a wedge part 10 fastened to the first side 17 of the braking piston 8. This wedge part 10 may have a triangular section and be configured to cooperate with a set of rolling bearing stops 11, of which one of the rolling bearing stops may be linked to the body 2 while the other of the rolling bearing stops may be linked to the thrust rod 9. This thrust rod 9 may be provided with a wear adjuster configured to compensate for the wear of the linings of the brake in order to avoid reduction of the braking force by excessive play (further to wear of the linings).

The service brake 6 may comprise a spring 12 disposed around the thrust rod 9, between the rolling bearing stop which is linked to the latter and an inside edge of the body 2. This spring 12 is configured to return the stop which is linked to the thrust rod 9 against the wedge part 10.

The service brake 6 may comprise a first aperture 15 formed in the body 2 and configured to enable the movement of the thrust rod 9 through that first aperture 15. The service brake 6 may comprise a second aperture 16 formed in the body 2 and opening into the service brake pressure chamber 13. The service brake pressure chamber 13 is connected here by a first supply pipe, denoted CA1 in FIG. 1, of the conveyance network of pneumatic pipes, more generally called brake pipe, which pipe is connected at the location of that second aperture 16, to a source of supply of pneumatic pressure agents (not shown).

The body 2 comprises a cavity 27 situated against the service brake pressure chamber 13 and in which the parking brake 7 is disposed. The parking brake 7 comprises a blocking device formed by a blocking finger 20 movable relative to the body 2 and extending in the second axial direction. The parking brake 7 comprises a holding piston 23 movable relative to the body 2 and with the latter delimiting a parking brake pressure chamber 25. This holding piston 23 has two sides, respectively a first side 31 on which is attached the blocking finger 20 and which is turned towards the parking brake pressure chamber 25, and a second side 32 which is an opposite side to the first side.

The parking brake 7 comprises a spring member 24 disposed between the body 2 and the second side 32 of the holding piston 23. This spring member 24 is configured to act on that holding piston 23 and therefore on the blocking finger 20. The holding piston 23 and the spring member 24 may form a movable actuating device of the parking brake 7. The holding piston 23 is configured to move in the body 2 while maintaining the parking brake pressure chamber 25 relatively fluid-tight thanks to a membrane disposed between that holding piston 23 and the inside edges of the body 2.

The parking brake 7 comprises a third aperture (not shown) formed in the body 2 and opening both into the parking brake pressure chamber 25 and into the service brake pressure chamber 13, which third aperture is configured to enable the movement of the blocking finger 20 through that third aperture. The relative sealing between the parking brake pressure chamber 25 and the service brake pressure chamber 13 is ensured by the presence of a seal 33 disposed at the interface between that third aperture and the blocking finger 20.

The parking brake 7 comprises a fourth aperture 28 formed in the body 2 and opening into the parking brake pressure chamber 25. The parking brake pressure chamber 25 may be connected here by a second supply pipe, denoted CA2 in FIG. 1, of the conveyance network of pneumatic pipes, also called parking brake pipe, which is connected at the location of that fourth aperture 28, to the source of supply of pneumatic pressure agents 73 (visible in FIG. 2) via the unit 3.

The parking brake 7 comprises an unlocking part 29 to deactivate the parking brake 7. The unlocking part 29 may for example be attached on the second side 32 of the holding piston 23 and open to the outside of the body 2 through a fifth aperture (not shown) provided in that body 2 and opening into the cavity 27. The unlocking part 29 is accessible to be manipulated from outside the body 2 if required. The unlocking part 29 may be connected to an indicator device provided to indicate a state of the parking brake 7 and/or a state of the service brake 6. In particular, the unlocking part 29 may be coupled to a switch mechanically connected to that part 29 and having a first position and a second position selected according to the position of the unlocking part 29.

The service brake 6 is disposed in the body 2 and is configured to act on one or more braking members 35 of the rail vehicle via the braking linkage 4. The braking member 35 of the vehicle may comprise a brake disk (here viewed from above) mounted for example on a rail vehicle axle 36, or directly on the wheel to brake. The braking linkage 4 is provided with a device 5 having linings which is provided to apply forces on the brake disk 35 when the linkage 4 is actuated. This device 5 here comprises two lining mountings 37 to each of which linings 38 are mechanically connected. In particular, two linings 38 may be mounted on each lining mounting 37. Each lining 38 is provided to be applied to contact the disk 35 to reduce its rotational speed and therefore that of the wheel to brake.

The braking linkage 4 here comprises levers 40, for example that are substantially deformable. In the described example, each lever 40 is provided with an upper portion and with a lower portion which are joined and which extend from the service and parking brake to the device 5. Each portion of the levers 40 may be jointed to a central connector 41 via two pivots 42. The upper portion of each lever 40 may be linked by a first end to a respective joint 44, 45.

The braking linkage 4 may receive the body 2 between the upper portions of the deformable levers 40, at the location of the joints 44 and 45. The body 2 may be rotatably mounted on the joint 44 which is attached to an end of the thrust rod 9 whereas it may have a fixed mounting to the joint 45, which is directly attached to that body 2. The lower portion of each lever 40 may be linked, at a second end which is an opposite end to its first end, to one of the lining mountings 37 at the location of an attachment region 39 provided on the latter and which faces away from the linings 37.

The braking linkage 4 may comprise a first fastening member 43 joined to the central connector 41 for the mounting of that braking linkage 4 on the rail vehicle; in order for the lining mountings 37 to be situated on respective opposite sides of the brake disk 35 (or of the wheel of the rail vehicle).

The joints 44 and 45 coming towards each other may enable the lining mountings 37 to be moved apart from each other and that conversely, the separation of those joints 44 and 45 may enable the lining mountings 37 to be to clamped onto the brake disk 35 (or onto the rail vehicle wheel).

The control and actuation unit 3 is connected to the service brake pressure chamber 13 via the first supply pipe to which it is connected. This unit 3 is connected to the parking brake pressure chamber 25 via the second supply pipe, denoted CA in FIG. 1, to which it is connected. This unit 3 is supplied with pneumatic agents by a main pipe, denoted CP which passes generally along the rail vehicle. The unit 3 comprises system members (not shown in FIG. 1) which are configured to receive and process representational information relative for example to operational settings of the rail vehicle, by a first electrical and/or pneumatic and/or manual type channel, denoted A in FIG. 1.

These system members are furthermore configured to receive and process representational information relating to parameters of use of the rail vehicle, by a second channel of electrical and/or pneumatic and/or manual type, which is denoted B in FIG. 1. These system members may, for example, be formed by pneumatic relays and/or solenoids and/or pressure switches and/or sensors and/or pressure reducing valves and/or electrical relays and/or electronic cards and/or central processing units or microprocessors, and/or random access memory components comprising registers adapted to record variables of the parameters created and modified during the execution of programs, and/or communication interfaces configured to send and receive data, and/or internal storage members, such as hard disks, able in particular to store the executable code of programs enabling the management of the service and parking brakes 6 and 7. The control and actuation unit 3 may be associated with one or more braking linkages of the rail vehicle.

Figure 2:
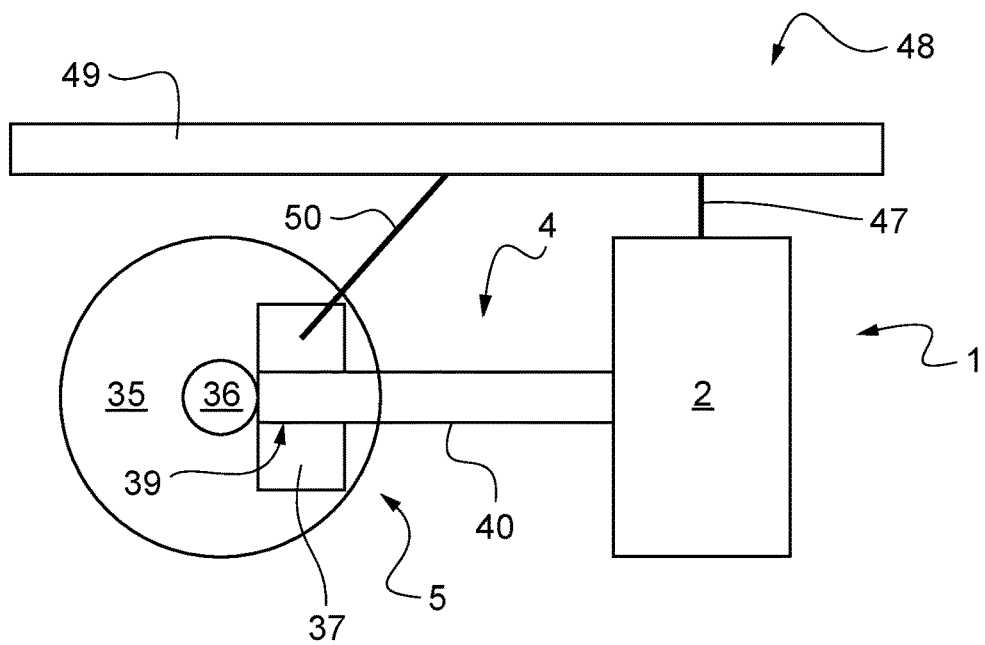
FIG. 2 is a partial and diagrammatic representation of the system illustrated in FIG. 1, mechanically connected to an axle for a bogie of a rail vehicle comprising such a rail vehicle braking system.

FIG. 2 very diagrammatically shows the rail vehicle 48 provided with an axle forming a mounting 49 to which the system 1 is mechanically connected, via for example a second fastening member 47 which links the body 2 to the mounting 49. The system 1 comprises at least one force transmission link member 50 mechanically connected by a first end to the mounting 49 of the vehicle 48 and by a second end, which is an opposite end to the first end, to the lining mounting 37. The lining mounting 37 here faces opposite a face of the disk 35 mounted on its axle shaft 36 of the vehicle 48.

Figure 3:
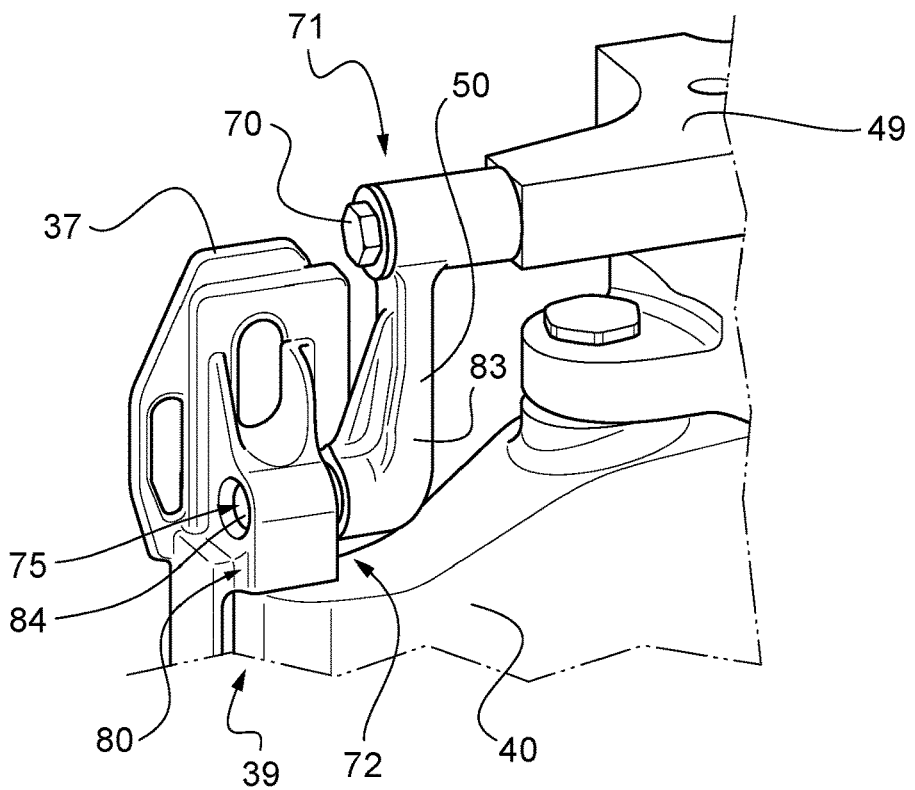
FIG. 3 illustrates a force transmission link member mechanically connected to a lining mounting of the rail vehicle braking system and to the axle of a bogie.
Figure 4:
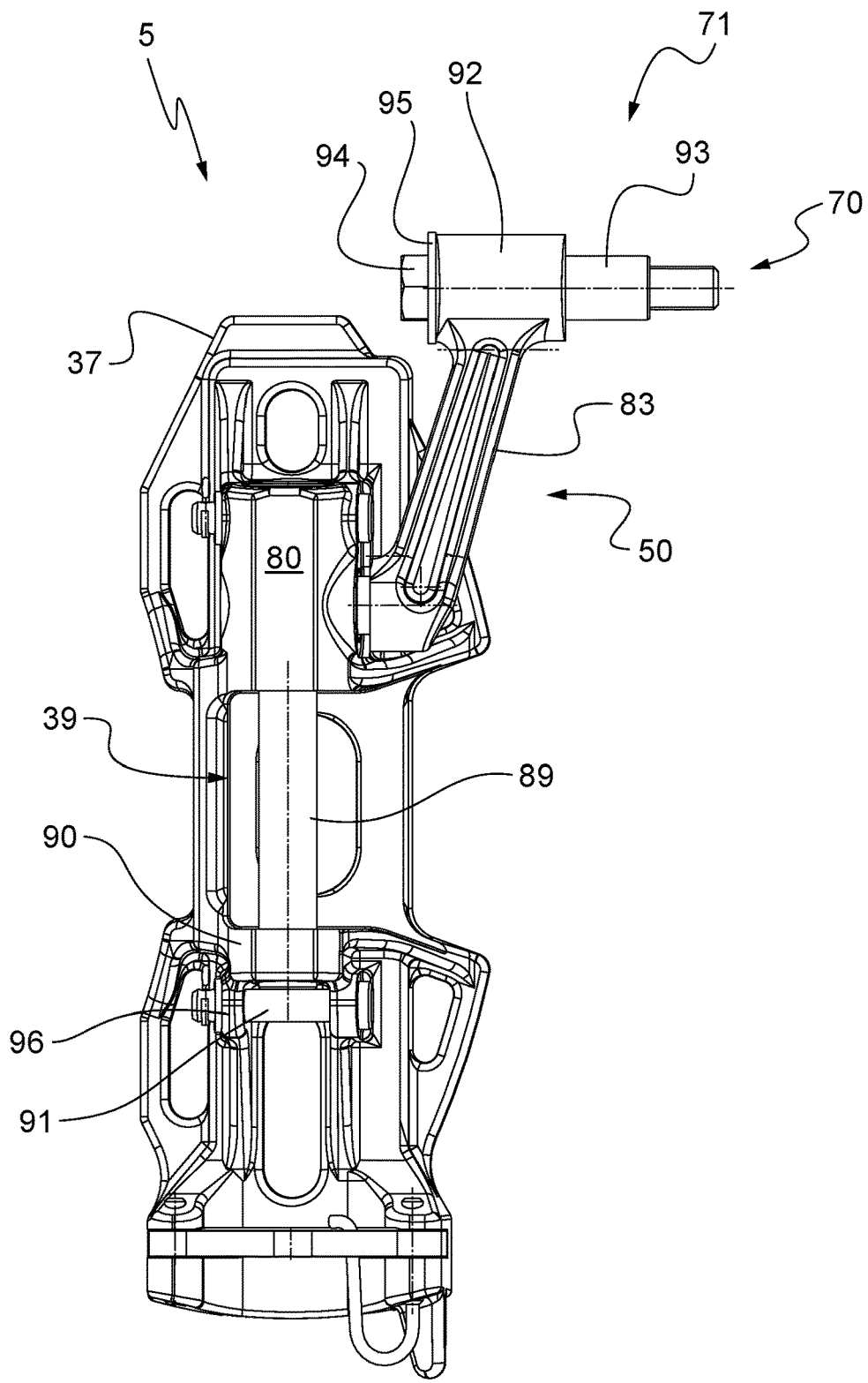
FIG. 4 is a detailed view of the force transmission link member mechanically connected to the lining mounting.
Figure 5:
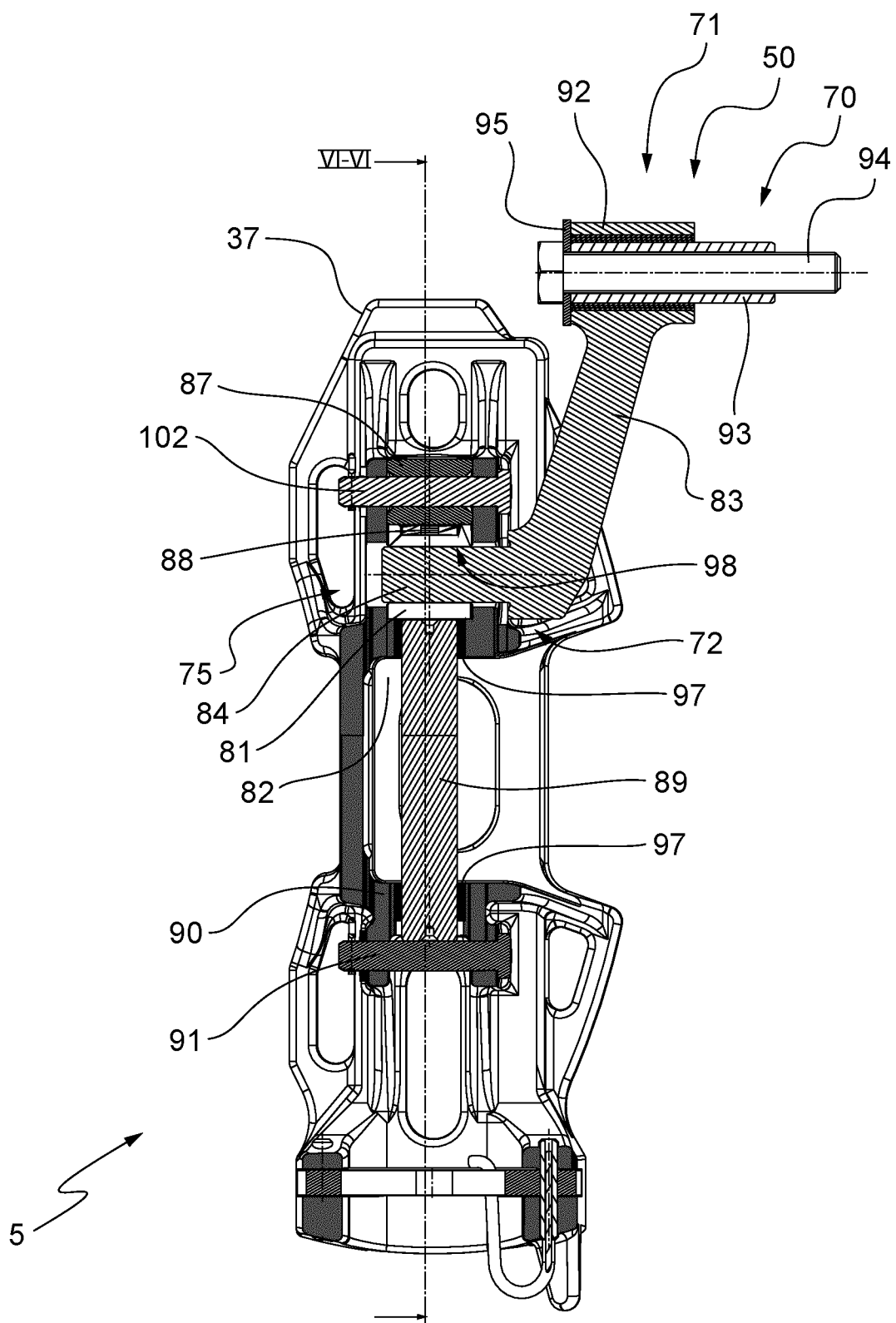
FIG. 5 is a front cross-section view of FIG. 4.
Figure 6:
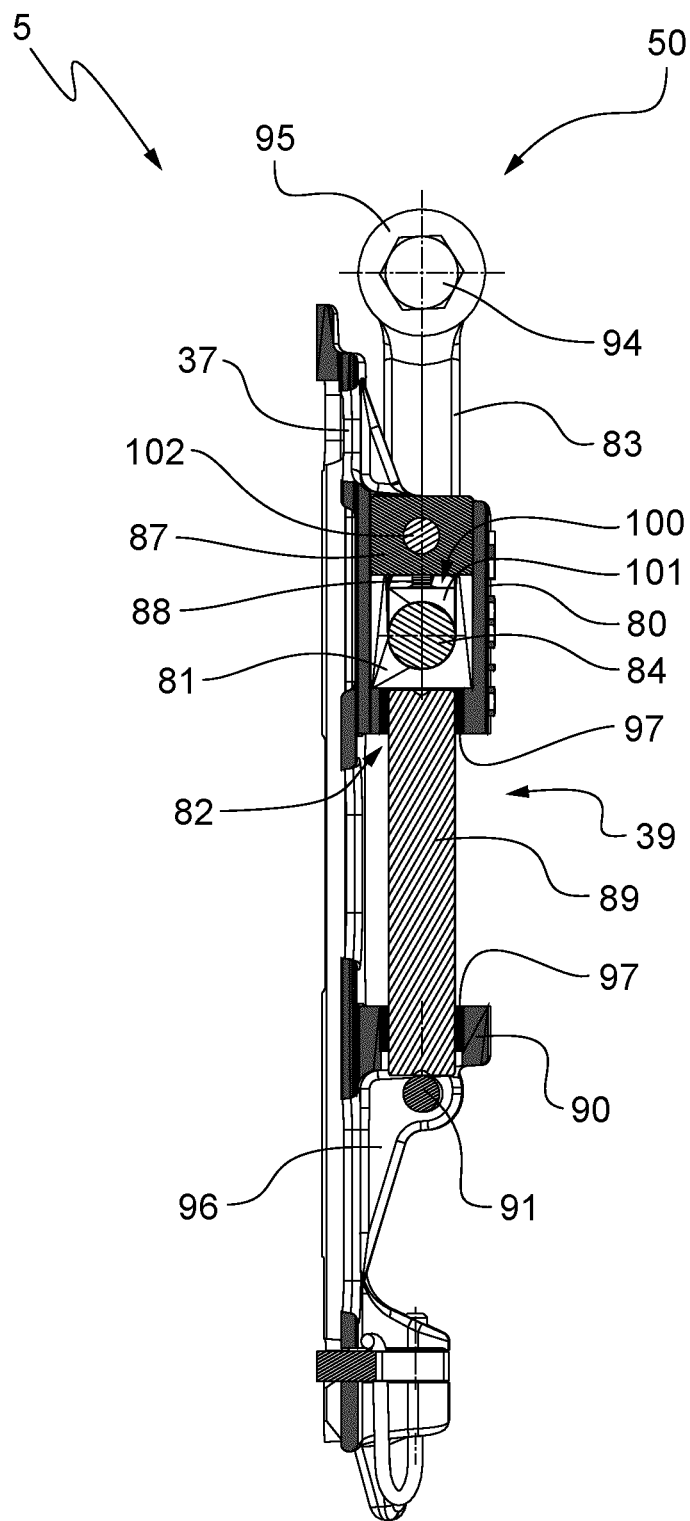
FIG. 6 is a lateral cross-section view of FIG. 4.
Figure 7:
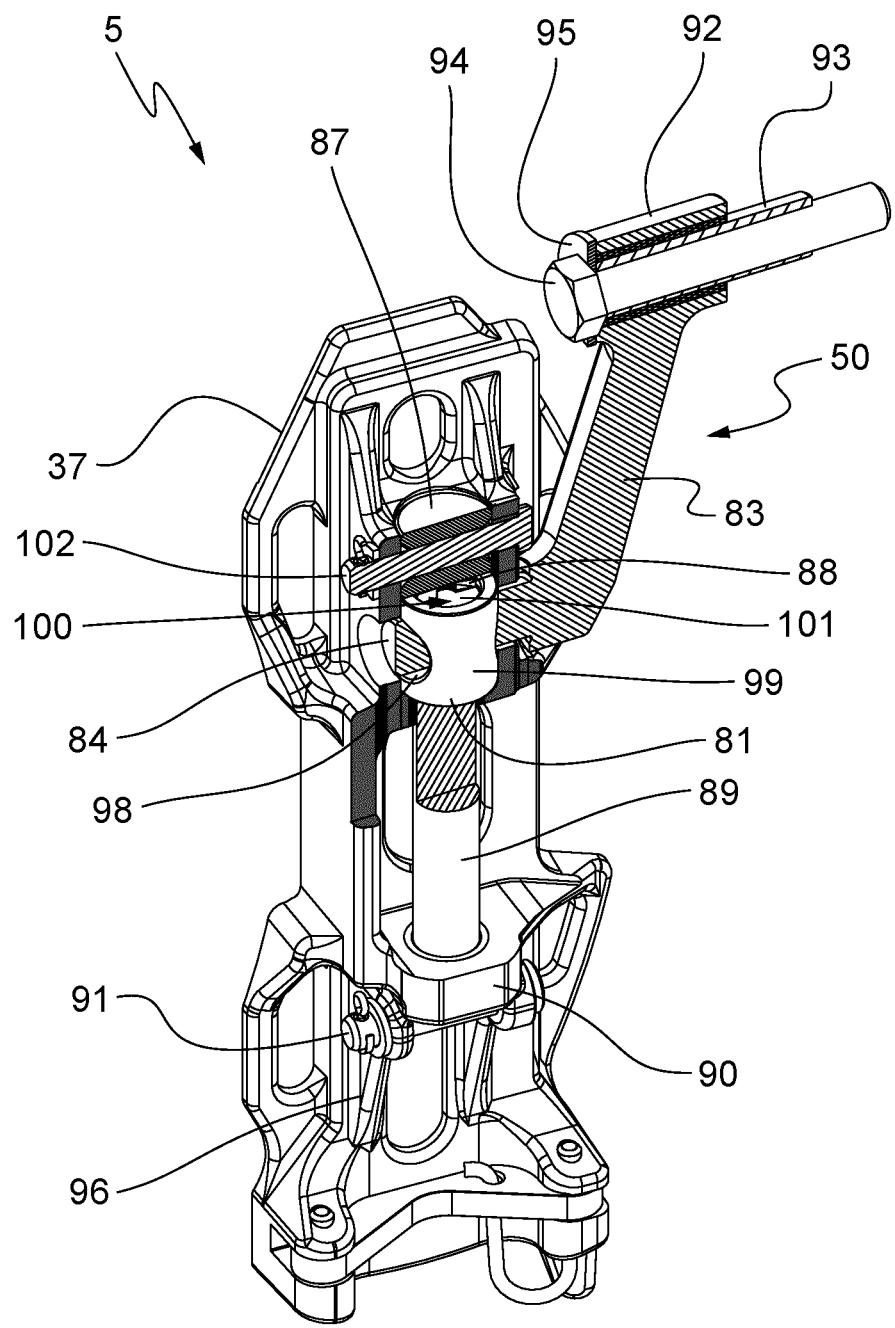
FIG. 7 is a similar view to that of FIG. 4, in perspective and partial cross-section at the location of the transmission link member and of the part of the lining mounting where it is mechanically connected.

FIG. 3 illustrates an example embodiment of the force transmission link member 50. The force transmission link member 50 here is substantially L-shaped or S-shaped. The force transmission link member 50 extends substantially in a same plane as that in which said lever 40 extends. Such an arrangement is particularly compact and enables a maximum travel of the lining mounting 37 relative to the mounting 49, thanks the L-shaped or S-shaped force transmission link member 50 which does not cause hindrance by the movement of the lining mounting 37. The link member 50 comprises a main arm 83 extending between a first end 71 at which the link member 50 is mechanically connected to the mounting 49 by a pivotal connection 70, and a second end 72, which is an opposite end to its first end 71, at which the link member 50 is mechanically connected, via a shaft 84, to the lining 37 mounting by a pivotal connection 75.

In particular, the lining mounting 37 is provided with a fastener lug 80 to which is mechanically connected the link member 50. The force transmission link member 50 is mechanically connected here to the lining mounting 37 in immediate proximity to the attachment region 39 of the lever 40.

As can be seen in more detail with reference to FIGS. 4 to 7, the fastener lug 80 is located here in immediate proximity to the attachment region 39 of the lever 40 such that the link member 50 is mechanically connected to the lining mounting 37 in immediate proximity to that attachment region 39 of the lever 40. The lining mounting 37 comprises a lower support 90 provided at a distance from the fastener lug 80. The attachment region 39 of the lever here extends between the fastener lug 80 and the lower support. The lining mounting 37 further comprises a mounting axis 89 rotatably mounted between the fastener lug 80 and the lower support 90. The lining mounting 37 comprises eyelets 96 here formed immediately below the lower support 90 and in which is inserted a stop member 91, here formed for example by a pin and circlips assembly.

The mounting shaft 89 passes through the lower support 90 and rests on the stop member 91. The mounting shaft 89 enables the mechanical connection of the linkage lever (not shown). Mounting rings 97 are provided to enable the rotation of the mounting shaft 89. These mounting rings 97 are housed in the lower support 90 and in a housing 82 of the fastener lug 80.

The fastener lug 80 is furthermore provided with a mounting member 81, also referred to as intermediate linking member, housed in its housing 82. The mounting member 81 is inserted into the housing 82 of the fastener lug 80 and rests here on one end of the mounting shaft 89. Thus, the mounting shaft 89 is interposed here between the mounting member 81 and the stop member 91 located at the lower support 90. As a variant, the mounting member could be at a distance from the mounting shaft.

The mounting member 81 is formed here by a longitudinally extending substantially cylindrical body 99 having a through aperture 98 passing through the cylindrical body 99 in a transverse direction. The cylindrical body 99 here is furthermore provided with an upper opening 100 and a plug 101 translationally movable in the cylindrical body 99. The mounting member 81 here has dimensions such that it does not shift in the fastener lug 80. In other words, the mounting member 81 is mounted in the housing 82 of the fastener lug 80 without substantial play.

The lining mounting 37 here comprises a retaining part 87 fixedly mounted in the housing 82 of the fastener lug 80. The retaining part 87 is superposed with the mounting member 81, such that the latter is located here between the mounting shaft 89 and the retaining part 87. The retaining part 87 is provided with an aperture passed through by a fastening member 102, for example a pin and circlips assembly, which fastening member 102 is mounted in engagement on the fastener lug 80.

The lining mounting 37 further comprises here an elastic member 88 interposed between the retaining part 87 and the mounting member 81. In particular, the elastic member bears against the plug 101 which is movable in the cylindrical body 99 of the mounting member 81. This makes it possible to press upon the plug 101 and thus more or less obturate the through aperture 98 in the cylindrical body 99. The elastic member 88 may be formed by one or more Belleville washers.

In the described example, the shaft 84 of the link member 50 is integrally formed with the arm 83 and formed projecting therefrom, at the second end 72 of the link member 50. The shaft 84 of the link member 50 is inserted into the through aperture 98 in the cylindrical body 99 of the mounting member 81. The pivotal connection 75 is thus formed and the link member 50 is rotationally mounted by its second end 72 in the mounting member 81.

The elastic member 88 can enable a load to be applied via the plug 101 on the shaft 84 of the link member 50. In particular, this can generate a resisting couple to limit the rotation of the link member 50 relative to the lining mounting 37 during phases of locomotion without application of the brake. On the contrary, during a braking phase, the elastic member 88 does not hinder the rotation of the link member 50 relative to the lining mounting 37 to apply as well as possible the braking force to the braking member of the vehicle.

In addition, the arrangement of the elastic member 88 to provide slight suspension of the device 5 comprising the lining mounting 37 and the linings 38 relative to the link member 50. The arrangement of the lining mounting 37, of the link member 50, of the lever and of the mounting (not shown) is such that the link member 50 cannot disengage from the lining mounting, in normal conditions of use. Located remotely opposite, at the first end 71 of the link member 50, the latter is provided with a tubular portion 92 in which is mounted a fastening sleeve 93. A ring for example of composite material may be mounted on the fastening sleeve 93, to avoid the friction between that sleeve 93 and the tubular portion 92. This ring may furthermore provide slight suspension between the link member and the mounting to which it is mechanically connected;

A fastening member 94, for example a screw, passes through the fastening sleeve 93 and is fastened to the mounting (not shown) of the vehicle. A washer 95 is interposed between a fastening member head 94 and the tubular portion 92. The tubular portion 92 of the link member 50 is able to rotate relative to the fastening sleeve 93, around the pivotal connection 70 thus formed.

Figure 8:
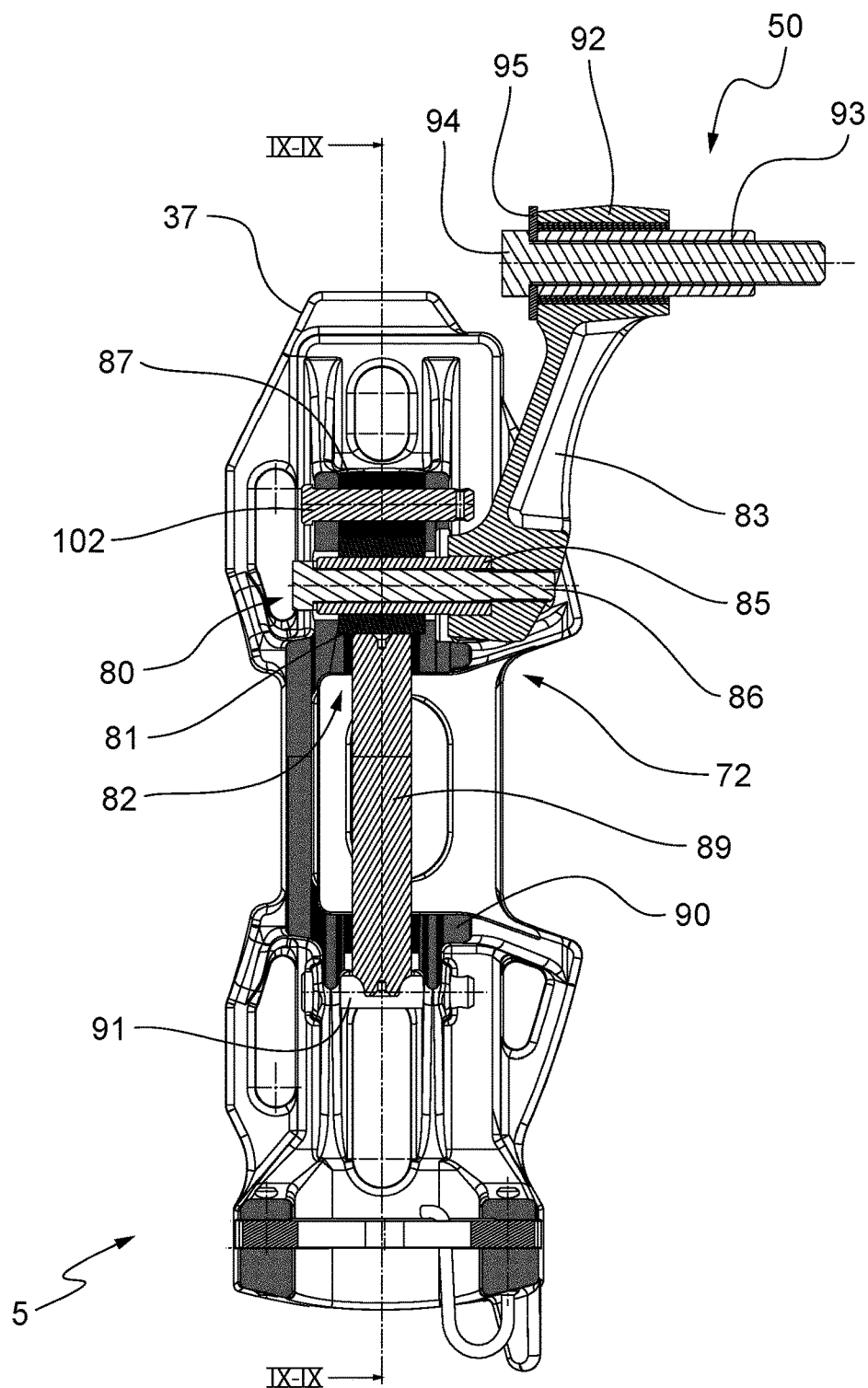
FIG. 8 is a front cross-section view, similar to that of FIG. 5, showing a variant embodiment of the transmission link member.
Figure 9:
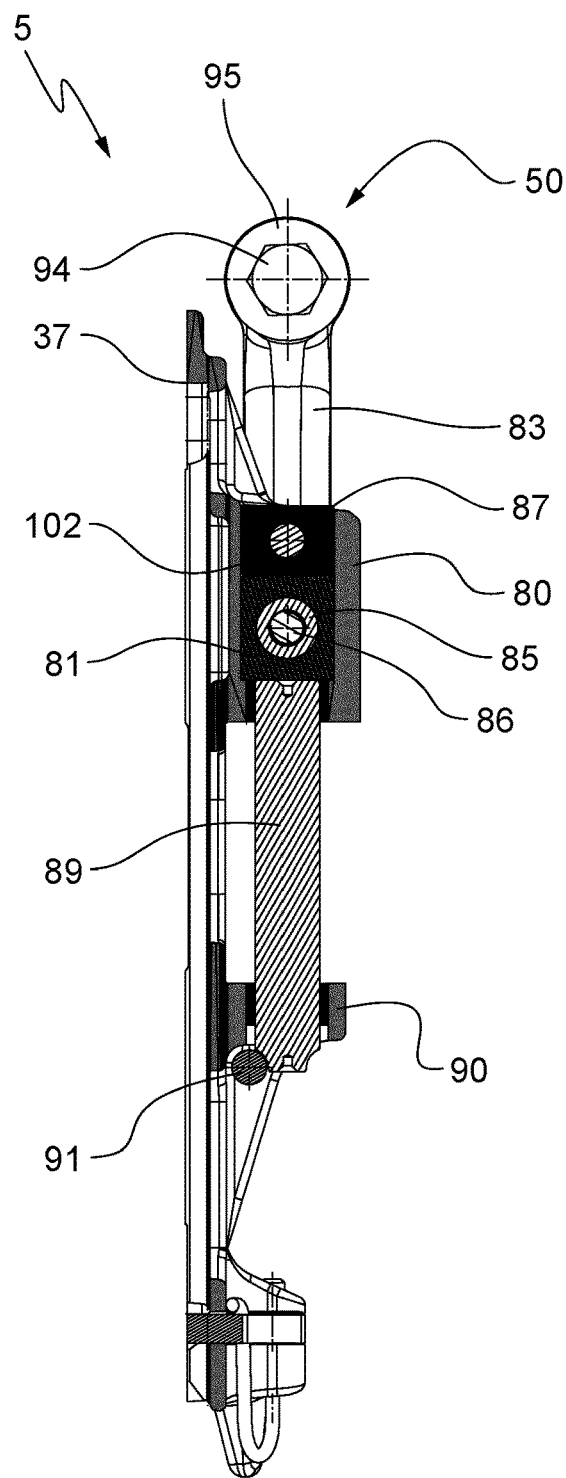
FIG. 9 is a lateral cross-section view, similar to that of FIG. 6, showing the variant embodiment of the transmission link member.
Figure 10:
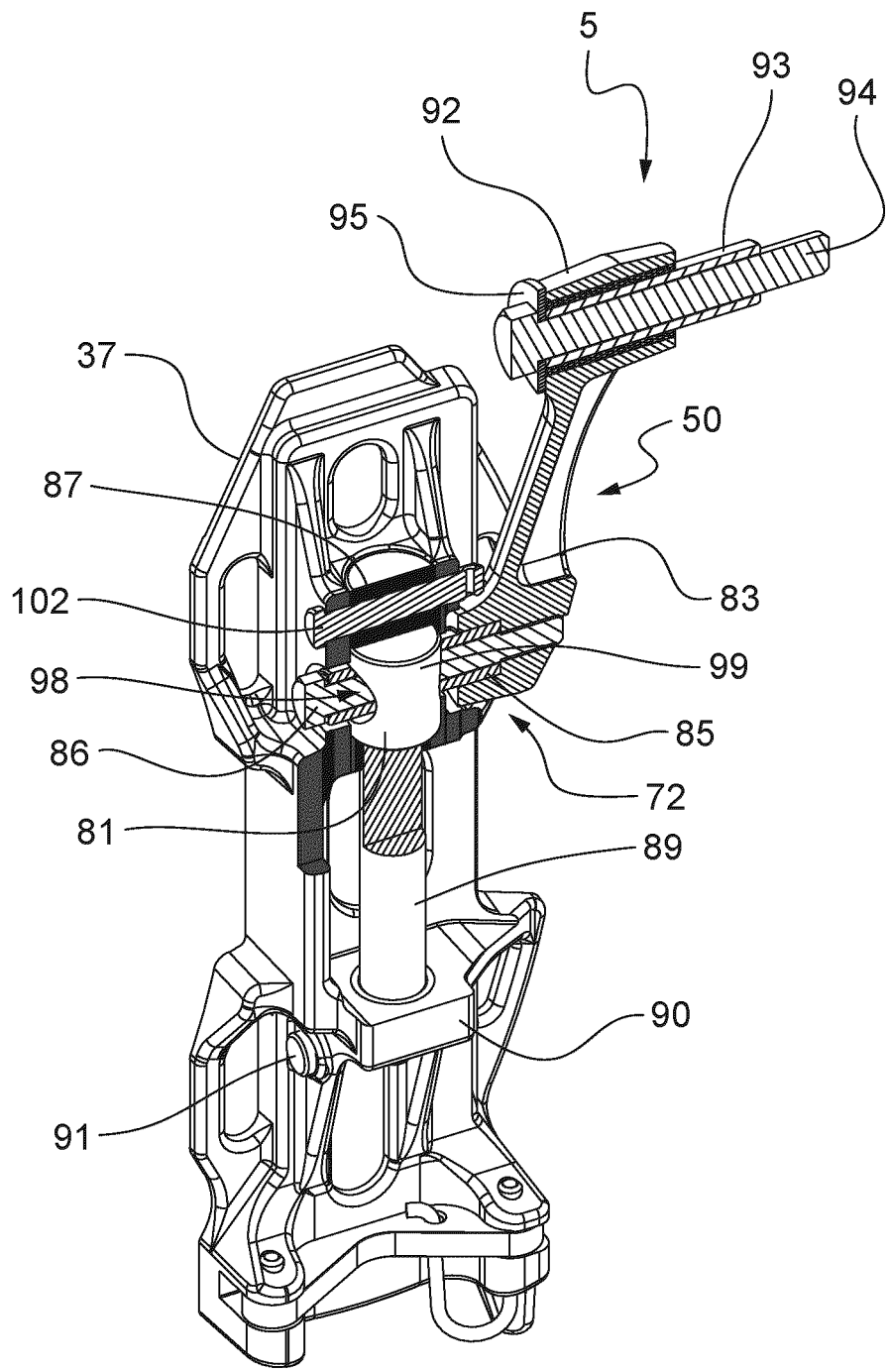
FIG. 10 is view similar to that of FIG. 7, showing the variant embodiment of the transmission link member.
Figure 11:
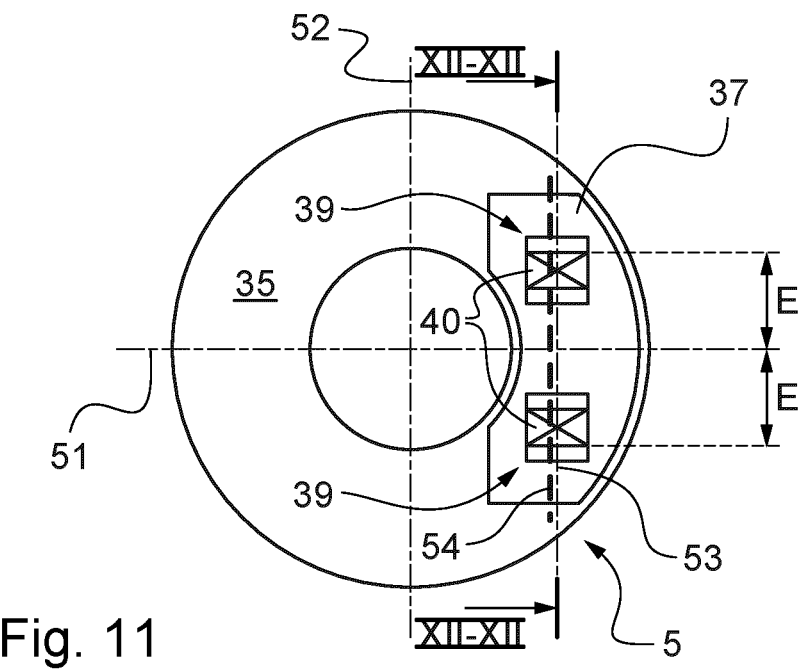
FIG. 11 is a diagrammatic representation of a lining mounting of the rail vehicle braking system of FIG. 1, which lining mounting is mounted facing opposite a first face of a brake disk also illustrated in FIG. 1.

FIGS. 8 to 10 illustrate another example embodiment of the force transmission link member 50, which differs from the link member described with reference to FIGS. 4 to 10 only in that it has no shaft integrally formed with the main arm. Its description will thus be made more briefly than above. The mounting member 81 is formed here by a longitudinally extending substantially cylindrical body 99 having a through aperture 98 passing through the cylindrical body 99 in a transverse direction. The cylindrical body here has no upper opening and no plug translationally movable in the cylindrical body.

The mounting member 81 is mounted in the housing 82 of the fastener lug 80 without substantial play. The mounting shaft 89 is rotatably mounted between the fastener lug 80, where it is in immediate proximity to the mounting member 81 and the lower support 90, where it rests on the stop member 91. The retaining part 87 is fixedly mounted in the housing 82 of the fastener lug 80, and is superposed with the mounting member 81, such that this latter is located here between the mounting shaft 89 and the retaining part 87. The retaining part 87 is provided with an aperture passed through by a fastening member 102, for example a pin and circlips assembly, which fastening member 102 is mounted in engagement on the fastener lug 80.

In the described example, at its second end 72 the link member 50 is provided with a sleeve 85 inserted into its main arm 83, and with a fastening member 86, formed for example here by a screw, mounted through the sleeve 85 and mechanically connected in the main arm 83. The assembly formed by the sleeve 85 and fastening member 86 is inserted into the through aperture 98 in the cylindrical body 99 of the mounting member 81. The pivotal connection 75 is thus formed and the link member 50 is rotationally mounted by its second end 72 in the mounting member 81. Remotely from the link member 50, the fastening sleeve 93 is mounted in the tubular portion 92, the fastening member 94 passes through the fastening sleeve 93 and is fastened to the vehicle mounting (not shown), with the washer 95 being interposed between a head of the fastening member 94 and the tubular portion 92. The tubular portion 92 of the link member 50 is able to rotate relative to the fastening sleeve 93, around the pivotal connection 70 thus formed.

A description will now be given in more detail, with reference to FIGS. 11 to 23, of the device 5 and of the arrangement of the levers 40 in relation to the device 5. In FIGS. 11 to 14, the device 5 is located facing opposite the brake disk 35. The device 5, comprising a lining mounting 37 and lining 38, has a longitudinal general orientation and a transverse general orientation. A longitudinal central axis 52 and a transverse central axis 51 are illustrated. The axes 51, 52 respectively correspond to the median axes of the brake disk 35. In the position illustrated in FIG. 11, the transverse central axis 51 furthermore corresponds to a transverse central axis of the device 5.

The lever 40 is mechanically connected to the lining mounting 37 via the attachment regions 39. The attachment regions 39 are located at most at approximately 35 mm from the transverse central axis 51 of the device 5. This means that the distances E shown in FIG. 3 are each at most equal to 35 mm. Here, the attachment regions 39 are located on opposite sides of the transverse central axis 51 and thus, at most, extend over approximately 70 mm in the direction of the longitudinal general orientation.

More generally, the attachment region or regions 39 may be located between approximately 0 and approximately 35 mm from the transverse central axis 51 and may extend in a longitudinal general orientation and over a length comprised between approximately 15 mm and approximately 70 mm. In the described example, the attachment regions 39 extend interruptedly on opposite sides of the transverse central axis 51. In other words, the attachment regions 39 are distinct. As a variant, the attachment region may extend uninterruptedly on opposite sides of the transverse central axis 51.

A longitudinal force application axis 53 is illustrated in fine chain line, while a longitudinal holding axis 54 is illustrated in thick chain line. The longitudinal force application axis 53 is the one passing through the attachment regions 39 of the lining mounting 37, which regions enable the mechanical connection of the levers 40, while the longitudinal holding axis 54 is slightly offset relative to the longitudinal force application axis 53 and corresponds to the region for fastening the linings 53 onto the lining mounting 38.

The loads applied by the lever 40 of the braking linkage 4 on the device 5 of that linkage 4 to place it in contact with the brake disk 35 are thus substantially centered on the lining mounting 37. Since the attachment regions 39 of the lever 40 on the lining mounting 37 are close to the central transverse axis 51, this enables the lining mountings 37 to have a degree of freedom when it transmits forces to the brake disk 35.

In the described example, the device 5 comprises at least two bearing regions 60 on the brake disk 35 and at least one set back region 61 located between the two bearing regions 60. More generally, the device may comprise a plurality of bearing regions between which are formed set back regions. The bearing and set back regions 60, 61 succeed each other in the direction of the longitudinal general orientation of the device 5. The two bearing regions 60 and the set back region 61 are provided here on a face of the lining mounting 37, which is an opposite face to that on which are formed the attachment regions 39.

Figure 14:
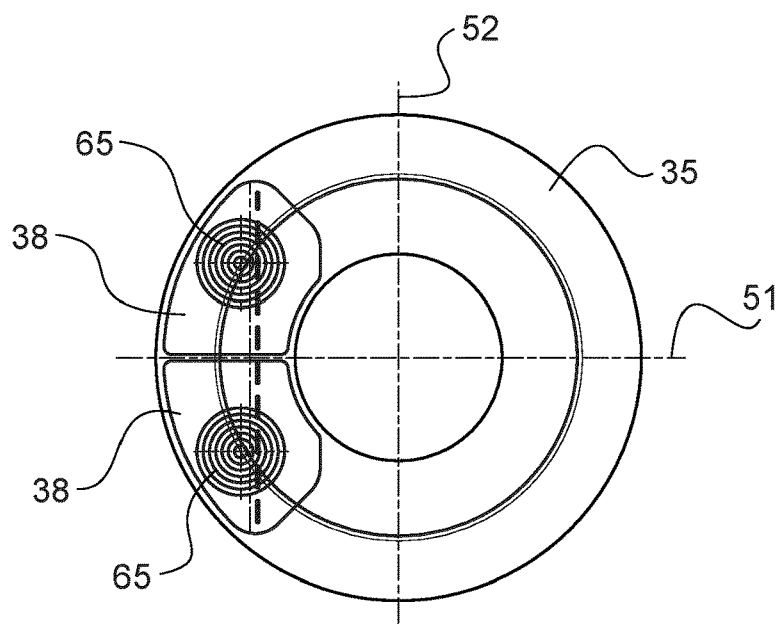
FIG. 14 diagrammatically illustrates linings facing opposite the first face of the brake disk, which linings are provided to be carried by the lining mounting.

Each of the two bearing regions 60 is provided here so as to be located facing opposite a respective lining 38. This is shown in FIGS. 14 and 15 in which can be seen the bearing regions 60 provided on the lining mounting 37 and in which can also be seen favored contact regions 65 provided on the linings 38, which respectively correspond to the bearing regions 60.

It will be noted that the bearing regions may be formed by protrusions on the lining mountings and/or that the set back region may be formed by recesses in the lining mountings. The bearing regions and the set back regions are thus located in planes that are offset. In the described example, the bearing regions 60 and the set back region 61 extend fully along the transverse general orientation of the device 5. Furthermore, the bearing regions 60 and the set back region 61 are formed here substantially symmetrically relative to the transverse central axis 51. The device 5 and the braking linkage 4 which comes into contact with the brake disk 35 is thus provided with a bearing surface referred to as discontinuous, with only the bearing regions 60 enabling forces to be transmitted to the brake disk 35. This enables the transmission of the forces to the brake disk 35 to be distributed.

Figure 15:
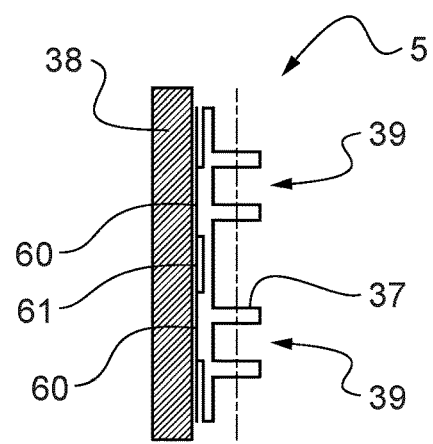
FIG. 15 is a similar view to that of FIG. 12, showing a first variant embodiment of the lining mounting.
Figure 16:
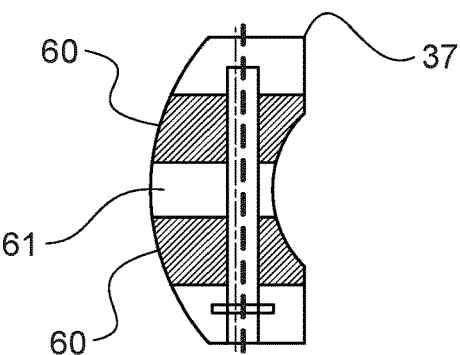
FIG. 16 is a similar view to that of FIG. 13, showing the first variant embodiment of the lining mounting.
Figure 17:
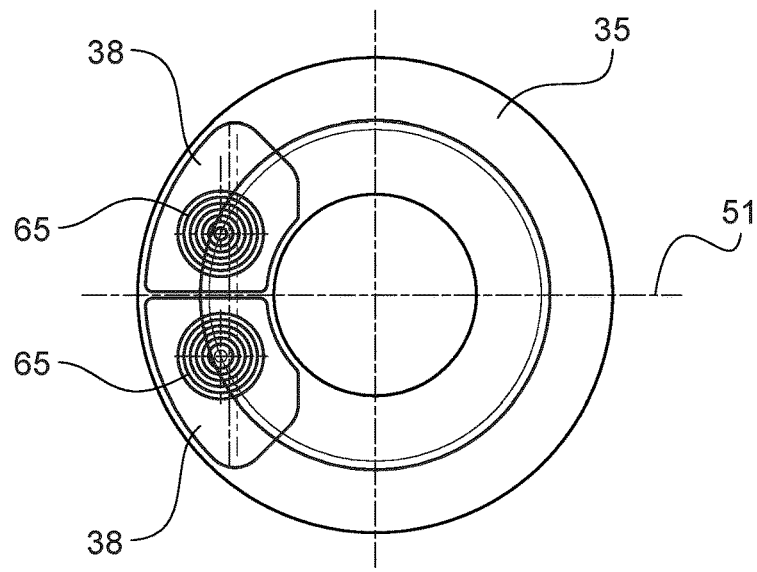
FIG. 17 is a similar view to that of FIG. 14, the linings being mounted on the first variant embodiment of the lining mounting.

In FIGS. 15 to 17, the bearing regions 60 are closer to each other and to the transverse central axis 51, and the set back region 61 is more limited. This results in the favored contact regions 65 provided on the linings 38 and which respectively correspond to the bearing regions 60 are also closer to each other and to the transverse central axis 51. The attachment regions 39 are identical to those described above.

In FIGS. 18 to 21, the lever 40 is mechanically connected to the lining mounting 37 via a single attachment region 39. The attachment region 39 is at the location of the transverse central axis 51 of the device 5 and extends slightly on opposite sides of that axis 51. For example, the attachment region extends only approximately 10 mm to approximately 20 mm on opposite sides of the transverse central axis 51. This means that the distance E shown in FIG. 10 is at most equal to approximately 40 mm, in the direction of the longitudinal general orientation. More generally, such a single attachment region may extend in a longitudinal general orientation and over a length comprised between approximately 15 mm and approximately 70 mm. The single attachment region 39 here extends uninterruptedly on opposite sides of the transverse central axis 51.

The loads applied by the lever 40 of the braking linkage 4 on the device 5 of that linkage 4 to place it in contact with the brake disk 35 are thus substantially centered on the lining mounting 37. Since the attachment region 39 of the lever 40 on the lining mounting 37 is at the location of the central transverse axis 51, this enables the lining mountings 37 to have a degree of freedom when it transmits forces to the brake disk 35. In the described example, the device 5 comprises at least two bearing regions 60 on the brake disk 35 and at least one set back region 61 located between the two bearing regions 60.

The bearing and set back regions 60, 61 succeed in the direction of the longitudinal general orientation of the device 5 and are identical to that of the device illustrated in FIGS. 11 to 14. The two bearing regions 60 and the set back region 61 are provided here on a face of the lining mounting 37, which is an opposite face to that on which are formed the attachment regions 39, and each of the two bearing regions 60 is provided here so as to be located facing opposite a respective lining 38.

Favored contact regions 65 are thus provided on the linings 38, which respectively correspond to the bearing regions 60. The bearing regions 60 and the set back region 61 extend fully along the transverse general orientation of the device 5, and are provided here substantially symmetrically relative to the transverse central axis 51. The device 5 and the braking linkage 4 which comes into contact with the brake disk 35 is thus provided with a bearing surface referred to as discontinuous, with only the bearing regions 60 enabling forces to be transmitted to the brake disk 35. This enables the transmission of the forces to the brake disk 35 to be distributed.

Figure 22:
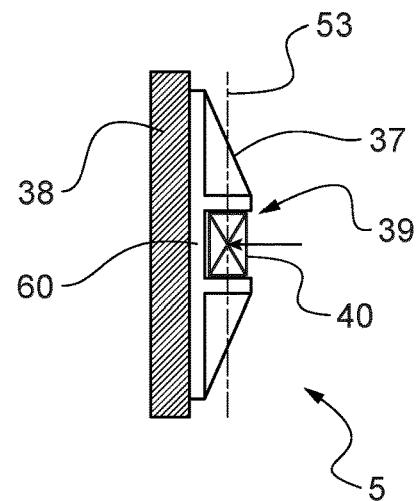
FIG. 22 is a similar view to that of FIG. 19, showing a first variant embodiment of the lining mounting according to the second embodiment of the system.
Figure 23:
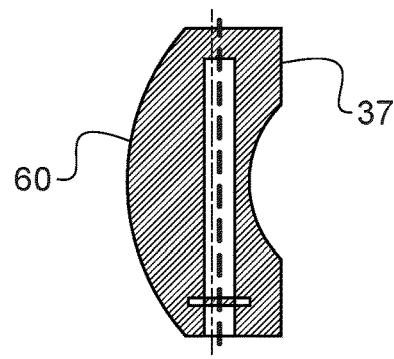
FIG. 23 is a similar view to that of FIG. 20, showing the first variant embodiment of the lining mounting according to the second embodiment of the system.

In FIGS. 22 and 23, the device 5 has no set back region and thus only has a single bearing region 60 which extends over the whole face of the lining mounting 37.

Figure 18:
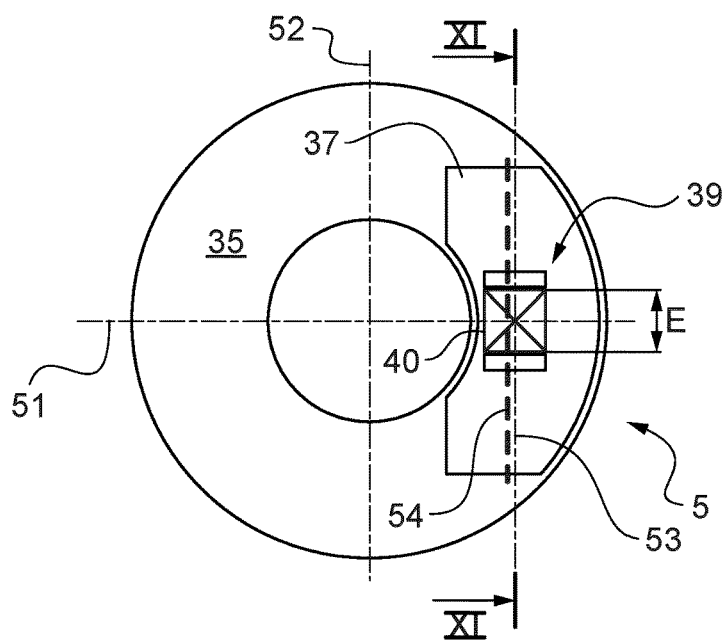
FIG. 18 is a similar view to that of FIG. 11, showing a lining mounting according to a second embodiment of the rail vehicle braking system of FIG. 1.
Figure 24:
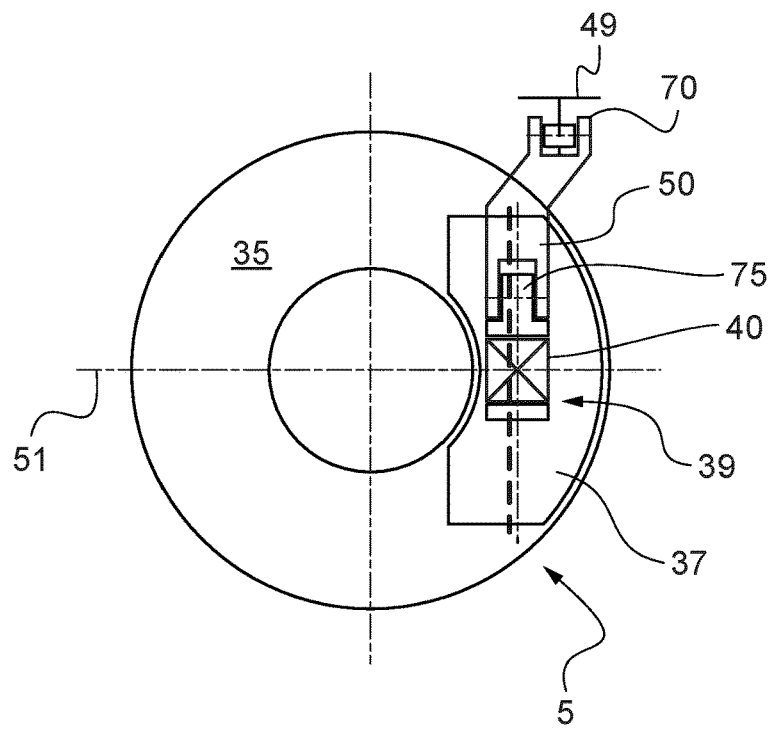
FIG. 24 is a similar view to that of FIG. 18, with, in addition, a force transmission link member which is mechanically connected to the lining mounting.

FIG. 24 is a similar view to that of FIG. 18, with addition of the force transmission link member 50 visible here very diagrammatically relative to FIGS. 3 to 10. As explained above, the force transmission link member 50 is mechanically connected at its first end 71 to the mounting 49 of the vehicle and at a second end 72, which is an opposite end to its first end, to the lining mounting 37, and in immediate proximity to the single attachment region 39 of the lever 40 on that same lining mounting 37. The force transmission link member 50 is mechanically connected by the pivotal connections 70, 75 respectively to the mounting 49 of the vehicle and to the lining mounting 37.

Figure 25:
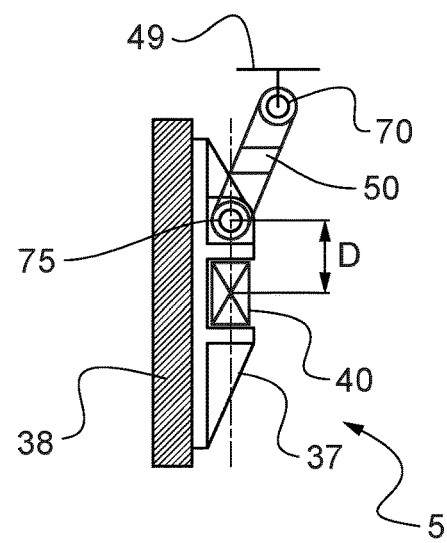
FIG. 25 is a similar view to that of FIG. 22, with addition of the force transmission link member.
Figure 26:
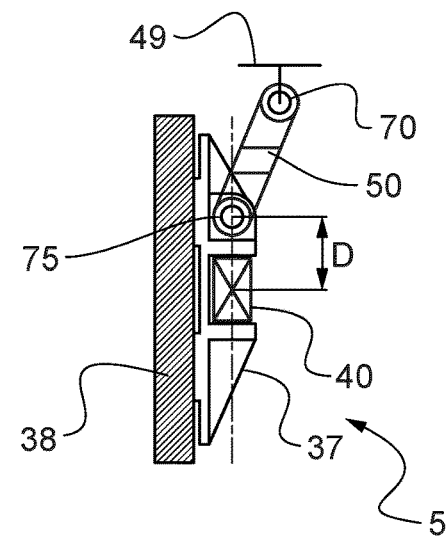
FIG. 26 is a similar view to that of FIG. 19, with addition of the force transmission link member.
Figure 27:
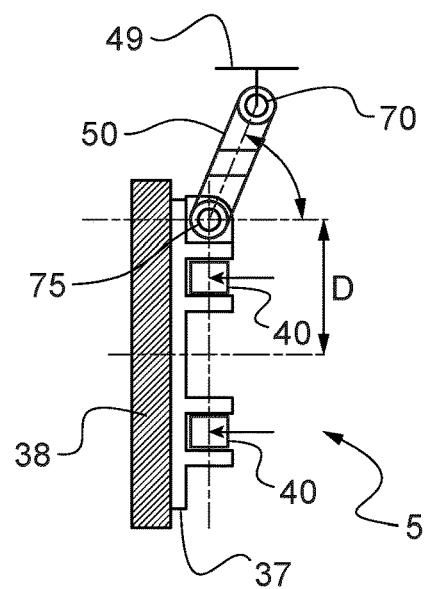
FIG. 27 is a view of the same kind as that of FIG. 12, showing a lining mounting according to a third embodiment of the rail vehicle braking system, with the force transmission link member.

Since the attachment regions 39 of the lever 40 on the lining mounting 37 are close to and/or are centered on the transverse central axis 51 of the device 5, the pivotal connection 75 which connects the force transmission link member 50 to the lining mounting 37 is also at a location close to that same transverse central axis 51, thereby limiting the distance D shown in FIGS. 25 to 27. This in particular makes it possible to have an especially compact system 1.

FIG. 25 also shows very diagrammatically the force transmission link member 50 mechanically connected to the lining mounting 37 of a device 5 similar to that described with reference to FIG. 22, without a set back region on the lining mounting 37, and with a single attachment region 39 of the lever 40 on the lining mounting 37.

Figure 19:
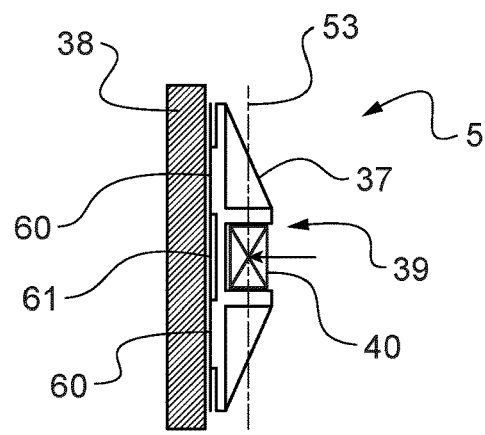
FIG. 19 is a cross section view on XIX-XIX of FIG. 18.
Figure 20:
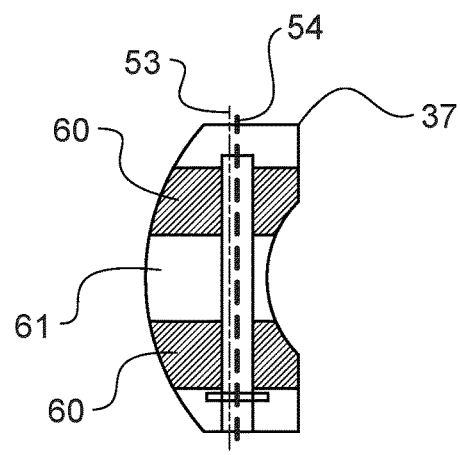
FIG. 20 is a diagrammatic representation of a contact face of the lining mounting illustrated in FIG. 18.
Figure 21:
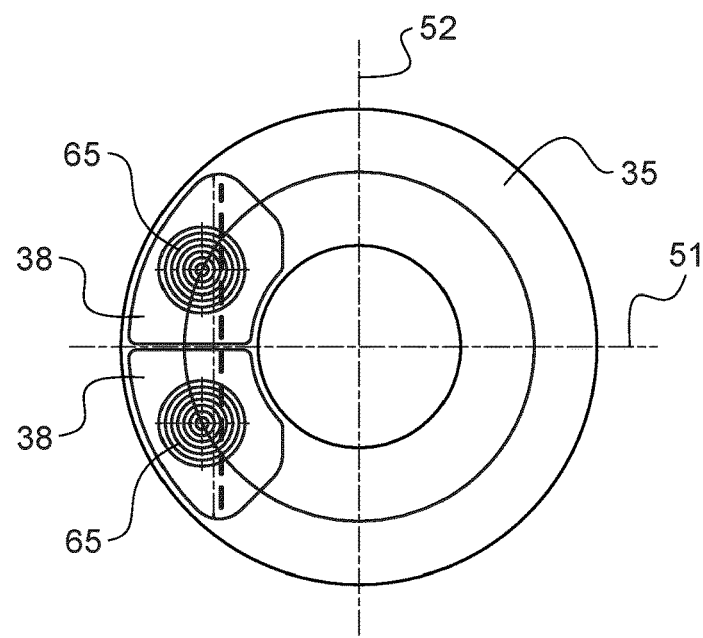
FIG. 21 is a similar view to that of FIG. 14.

FIG. 26 also shows very diagrammatically the force transmission link member 50 mechanically connected to the lining mounting 37 of a device 5 similar to that described with reference to FIG. 19, with bearing regions 60 and a set back region 61 provided on the lining mounting 37, and with a single attachment region 39 of the lever 40 on the lining mounting 37.

Figure 12:
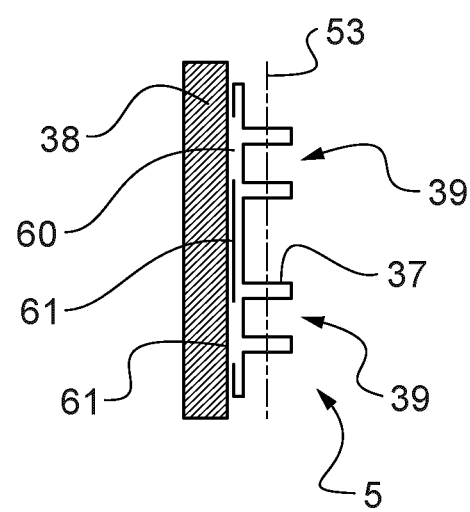
FIG. 12 is a cross section view on XII-XII of FIG. 11.
Figure 13:
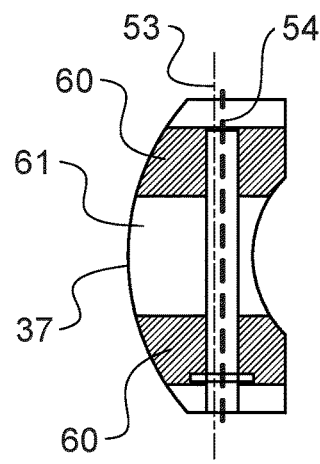
FIG. 13 is a diagrammatic representation of a contact face of the lining mounting illustrated in FIG. 11.

FIG. 27 also shows very diagrammatically the force transmission link member 50 mechanically connected to the lining mounting 37 of a device 5 quite close to those described with reference to FIGS. 12 and 15, but not having a set back region on the lining mounting 37 (in the same way as for those described with reference to FIGS. 22 and 25), while it comprises distinct attachment regions 39 for the lever 40 on the lining mounting 37.

Figure 28:
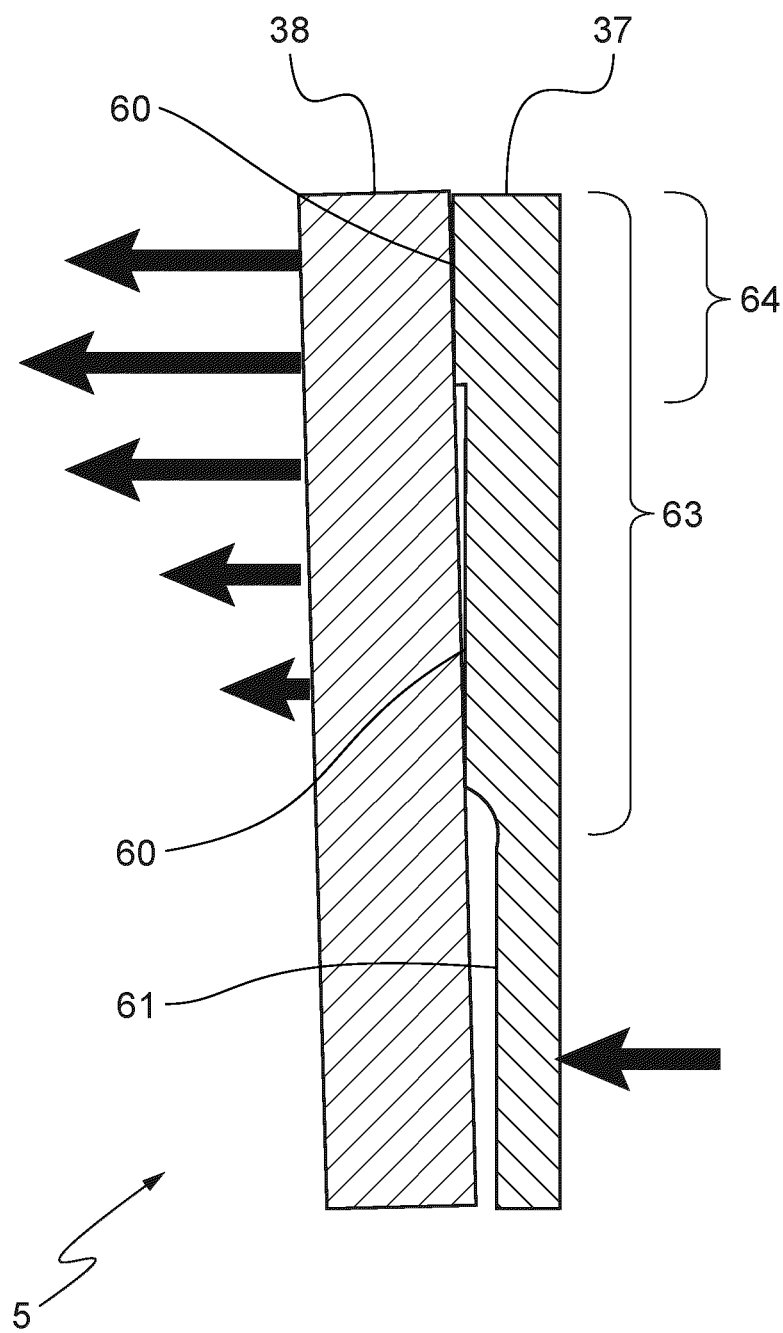
FIG. 28 is a very diagrammatic view showing a lining mounting according to a fourth embodiment of the rail vehicle braking system.

FIG. 28 diagrammatically shows the force transmission link member 50 mechanically connected to the lining mounting 37 of a device 5 quite close to those described above, but of which the bearing region 60 is here formed with steps. In other words, the bearing region 60 comprises different bearing portions 63 and 64 offset to a greater or lesser extent relative to the adjacent set back region 61. In particular, the bearing portion 63 forms what is designated an augmented-bearing region.

In variants not illustrated, the lining-mounting may comprise one or more set back regions extending for approximately 100 mm to approximately 300 mm from the transverse central axis of said device. The set back region or regions may be formed by cavities having a depth comprised for example between approximately 0.1 mm and approximately 0.5 mm. According to a first example embodiment, the lining-mounting can comprise a single set back region extending for approximately 180 mm (or for 90 mm on opposite sides of the transverse axis), and having a cavity of approximately 0.2 mm; the rest of the lining-mounting overall forming one or more bearing regions. According to a second example embodiment, the lining-mounting can comprise a first set back region extending for approximately 120 mm (or for 60 mm on opposite sides of the transverse axis), and having a cavity of approximately 0.3 mm, next the second set back regions either do or do not immediately succeed the first set back region, each extending for approximately 60 mm and having a cavity of approximately 0.15 mm; the rest of the lining-mounting overall forming one or more bearing regions. According to a third example embodiment, the lining-mounting can comprise a first set back region extending for approximately 120 mm (or for 60 mm on opposite sides of the transverse axis), and having a cavity of approximately 0.35 mm, next the second set back regions either do or do not immediately succeed the first set back region, each extending for approximately 60 mm and having a cavity of approximately 0.2 mm; the rest of the lining-mounting overall forming one or more bearing regions. Such arrangements of the set back regions make it possible to distribute the transmission of the forces over the braking member.

Other variants not illustrated are described below.

The force transmission link member may be Y-shaped, H-shaped, or I-shaped rather than L-shaped or S-shaped. The elastic member may be formed by at least one spring which may for example be helical, or by at least one elastomer rather than by one or more Belleville washers. The bearing regions and/or the set back region may be provided in the linings rather than in the lining mountings. Some bearing and/or set back regions may extend fully along the transverse general orientation, while other of these regions may extend only partly. The bearing and set back regions are not provided substantially symmetrically relative to the transverse central axis. A single lining, rather than two linings, is mounted on each of the lining mountings, or, on the contrary, more than two linings are mounted on each of the lining mountings. The attachment region of the lining-mounting to which is mechanically connected the lever is located at most 35 mm from the transverse central axis of the device. The rail vehicle braking system may be different from that described above in that it may concern only a service brake, or concern only a parking brake, and in that the mechanism may have springs as has for example been described in document EP 2 154 040.

More generally, the invention is not limited to the examples described and illustrated.

The invention claimed is:

1. A vehicle braking system, comprising:
a braking linkage;
a brake configured to act on at least one braking member of a vehicle via the braking linkage, the braking linkage provided with at least one device having at least one lining mounting and at least one lining mechanically connected to the at least one lining mounting; and
a force transmission link mechanically connected by a first end to a mounting of the vehicle and by an opposite second end to the at least one lining mounting, the at least one lining mounting including an attachment lug provided with a housing and with a mounting member housed in the housing, the force transmission link rotatably mounted by the second end in the mounting member, wherein the at least one lining mounting comprises a retaining part fixedly mounted in the housing and superposed with the mounting member, and wherein the at least one lining mounting comprises at least one elastic member interposed between the retaining part and the mounting member.

2. The vehicle braking system of claim 1, wherein the force transmission link is substantially L-shaped, S-shaped, H-shaped, or Y-shaped.

3. The vehicle braking system of claim 1, wherein the force transmission link is mechanically connected by pivotal connections to the vehicle mounting and to the at least one lining mounting.

4. The vehicle braking system of claim 1, wherein the force transmission link is provided at the second end with a shaft integrally formed with the force transmission link and projecting from a main arm of the force transmission link.

5. The vehicle braking system of claim 1, wherein the force transmission link is provided at the second end with a sleeve inserted into a main arm of the force transmission link and with a fastening member mounted through the sleeve and mechanically connected in the main arm.

6. The vehicle braking system of claim 1, wherein the at least one elastic member is formed by one or more of at least one Belleville washer, at least one spring, or at least one elastomer.

7. A vehicle braking system, comprising:
a braking linkage;
a brake configured to act on at least one braking member of a vehicle via the braking linkage, the braking linkage provided with at least one device having at least one lining mounting and at least one lining mechanically connected to the at least one lining mounting; and
a force transmission link mechanically connected by a first end to a mounting of the vehicle and by an opposite second end to the at least one lining mounting, the at least one lining mounting including an attachment lug provided with a housing and with a mounting member housed in the housing, the force transmission link rotatably mounted by the second end in the mounting member, wherein the braking linkage comprises at least one lever extending from the brake to the device to which the braking linkage is fastened at an attachment region of the at least one lining mounting, the at least one lever configured to transmit a force of application of the brake to the device, and the force transmission link is fastened in proximity to the attachment region of the at least one lever, and wherein the attachment region is located no more than 35 millimeters from a transverse central axis of the device having the at least one lining mounting and the at least one lining.

8. The vehicle braking system of claim 7, wherein the at least one lining mounting is provided with a lower support and with a mounting shaft rotatably mounted between the attachment lug and the lower support, the lever mechanically connected to the mounting shaft.

9. The vehicle braking system of claim 8, wherein the mounting shaft is interposed between the mounting member and a stop member located at the lower support.

10. The vehicle braking system of claim 7, wherein the force transmission link extends substantially in a same plane as that in which the at least one lever extends.

11. The vehicle braking system of claim 7, wherein the device comprises plural bearing regions for bearing on the at least one braking member and at least one set back region located between at least two of the bearing regions, wherein at least one of the bearing regions is formed with steps and comprises different bearing portions offset to a greater or lesser extent relative to the at least one set back region.

12. The vehicle braking system of claim 7, wherein the brake is selected from a group consisting of a parking brake and a service brake.

13. A vehicle braking system, comprising:
a brake;
a force transmission link, comprising:
a first end mechanically connected to a mounting of a vehicle; and
a second end;
a linkage comprising a lever and a frame, the lever extending intermediate the brake and the frame, the frame defining a transverse central axis, wherein the frame comprises:
a lining mount movable by the linkage, the lining mount, comprising:
an attachment region;
an attachment lug comprising a housing and a fastener;
a retainer fixedly mounted to the housing and superposed with the fastener; and
a spring interposed between the retainer and the fastener.

14. The vehicle braking system of claim 13, further comprising a lining mechanically attachable to the lining mount.

15. The vehicle braking system of claim 14, wherein the attachment region is spaced apart from the lining and is no more than 35 millimeters (mm) from the transverse central axis.

16. The vehicle braking system of claim 13, wherein the spring is selected from a group consisting of a Belleville washer, a coil spring, an elastomer, and combinations thereof.

17. The vehicle braking system of claim 13, wherein the brake is selected from a group consisting of a service brake and a parking brake.

18. A vehicle, comprising:
an axle;
a brake disc mounted on the axle;
a brake selected from a group consisting of a service brake and a parking brake;
a force transmission link, comprising:
a first end mechanically connected to a mounting of the vehicle; and
a second end;
a linkage comprising a lever and a frame, the lever extending intermediate the brake and the frame, the frame defining a transverse central axis, wherein the frame comprises:
a lining mount movable by the linkage, the lining mount, comprising:
an attachment region;
an attachment lug comprising a housing and a fastener;
a retainer fixedly mounted to the housing and superposed with the fastener; and
a spring interposed between the retainer and the fastener.

19. The vehicle of claim 18, further comprising a lining mechanically attachable to the lining mount, wherein the attachment region is spaced apart from the lining and is no more than 35 millimeters (mm) from the transverse central axis.

20. The vehicle of claim 18, wherein the spring is selected from a group consisting of a Belleville washer, a coil spring, an elastomer, and combinations thereof.

* * * * *